US012734933B2

(12) United States Patent
Kikuchi

(10) Patent No.: US 12,734,933 B2
(45) Date of Patent: Sep. 15, 2026

(54) BATTERY CONTROL APPARATUS FOR ELECTRIC VEHICLE

(71) Applicant: SUBARU CORPORATION, Tokyo (JP)

(72) Inventor: Jun Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/765,482

(22) Filed: Jul. 8, 2024

(65) Prior Publication Data

US 2024/0359593 A1 Oct. 31, 2024

Related U.S. Application Data

(63) Continuation of application No. PCT/JP2023/010660, filed on Mar. 17, 2023.

(51) Int. Cl.

| | |
|---|---|
| *B60L 58/22* | (2019.01) |
| *B60L 9/18* | (2006.01) |
| *B60L 50/60* | (2019.01) |
| *B60L 58/18* | (2019.01) |
| *H01M 10/42* | (2006.01) |
| *B60L 7/10* | (2006.01) |

(52) U.S. Cl.

CPC ........... *B60L 58/18* (2019.02); *H01M 10/425* (2013.01); *B60L 7/10* (2013.01); *B60L 2240/545* (2013.01); *H01M 2010/4271* (2013.01); *H01M 2220/20* (2013.01)

(58) Field of Classification Search

CPC ...... B60L 58/18; B60L 7/10; B60L 2240/545; H01M 10/425; H01M 2220/20

USPC ........................................................... 307/9.1

See application file for complete search history.

(56) References Cited

U.S. PATENT DOCUMENTS

2015/0061601 A1* 3/2015 Hatanaka ............. G01R 31/382 320/136
2024/0157819 A1* 5/2024 Namuduri ................. B60L 1/00
2025/0353388 A1* 11/2025 Borhan ................... B60L 53/12

FOREIGN PATENT DOCUMENTS

JP 2017-175758 A 9/2017
JP 6546554 B2 7/2019

OTHER PUBLICATIONS

International Search Report dated Mar. 28, 2023 from International Application No. PCT/JP2023/010660, 1 page.

* cited by examiner

*Primary Examiner* — Rexford N Barnie
*Assistant Examiner* — Swarna N Chowdhuri
(74) *Attorney, Agent, or Firm* — Rimon P.C.

(57) ABSTRACT

A battery control apparatus is to be mounted on an electric vehicle and includes a processor. The processor is configured to control a variable resistor of the electric vehicle. The processor is configured to execute a resistance adjustment process, based on a difference between a temperature of a first battery group of the electric vehicle and a temperature of a second battery group of the electric vehicle. The resistance adjustment process is configured to control the variable resistor to cause a current per unit capacity of the first battery group and a current per unit capacity of the second battery group to be evenly closer to each other than when the resistance adjustment process is unexecuted. The processor is configured to refrain from executing the resistance adjustment process upon driving of the electric vehicle in which electric power is to be outputted from a battery of the electric vehicle.

5 Claims, 6 Drawing Sheets

[ FIG. 1 ]
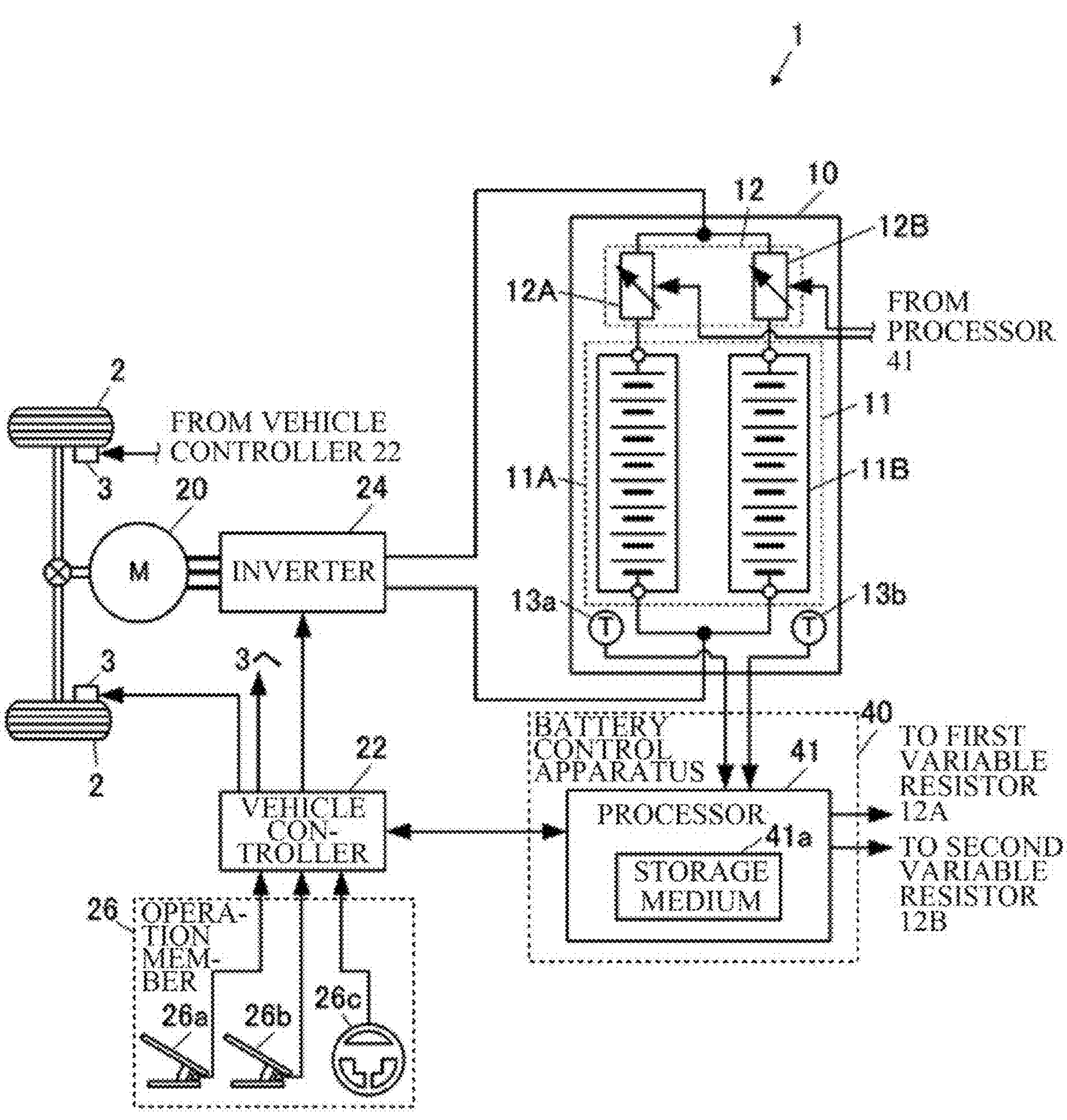

[ FIG. 2 ]
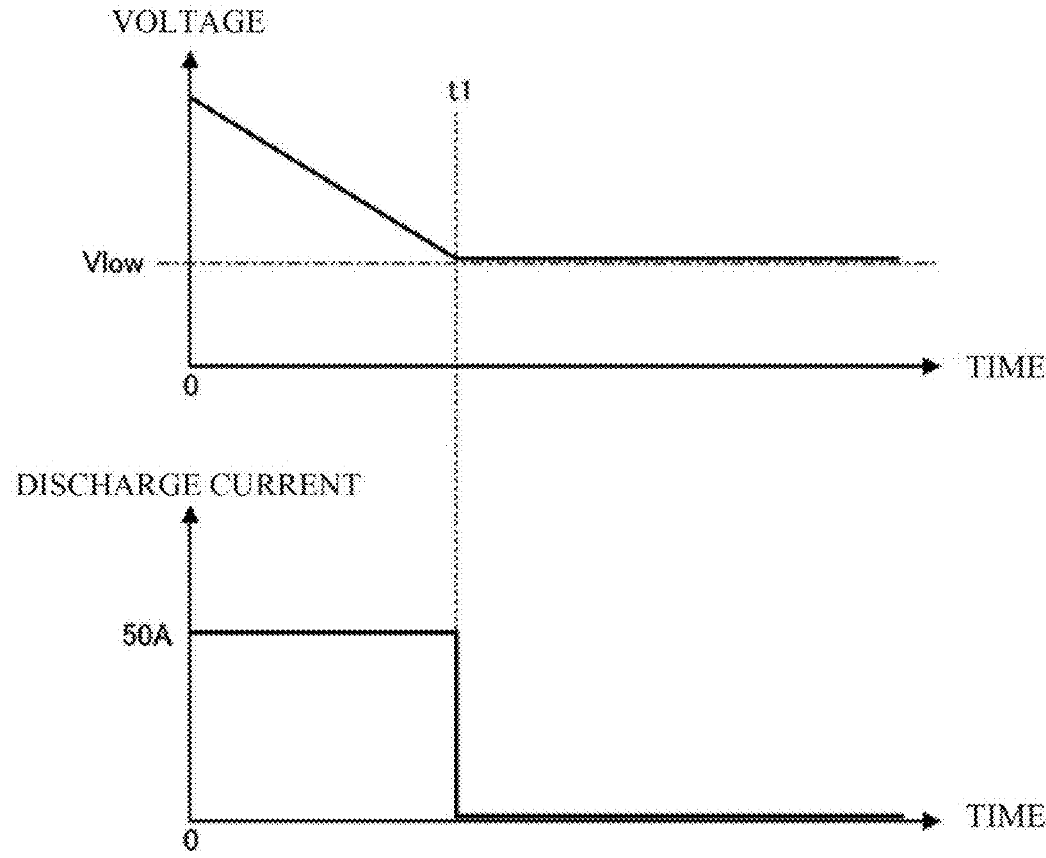

| DISCHARGEABLE ELECTRIC POWER Wout | | | | | | | | | | |
|---|---|---|---|---|---|---|---|---|---|---|
| | | BATTERY TEMPERATURE [°C] | | | | | | | | |
| | | −30 | −20 | −10 | 0 | 25 | 30 | 40 | 50 | 60 |
| SOC [%] | 0 | 0 | 0 | 0 | 0 | 0 | 0 | 0 | 0 | 0 |
| | 10 | 0 | 0 | 1 | 10 | 20 | 30 | 30 | 30 | 30 |
| | 20 | 0 | 0 | 10 | 15 | 30 | 40 | 40 | 40 | 40 |
| | 30 | 0 | 0 | 20 | 30 | 50 | 60 | 60 | 60 | 60 |
| | 40 | 0 | 0 | 30 | 35 | 75 | 90 | 90 | 90 | 90 |
| | 50 | 0 | 0 | 35 | 50 | 100 | 100 | 100 | 100 | 100 |
| | 60 | 0 | 0 | 40 | 60 | 105 | 105 | 105 | 105 | 105 |
| | 70 | 0 | 0 | 45 | 65 | 110 | 110 | 110 | 110 | 110 |
| | 80 | 0 | 0 | 50 | 70 | 115 | 115 | 115 | 115 | 115 |
| | 90 | 0 | 0 | 50 | 75 | 120 | 120 | 120 | 120 | 120 |
| | 100 | 0 | 0 | 50 | 75 | 125 | 125 | 125 | 125 | 125 |

LOW → HIGH (SOC, downward)

LOW → HIGH (battery temperature)

[ FIG. 4 ]
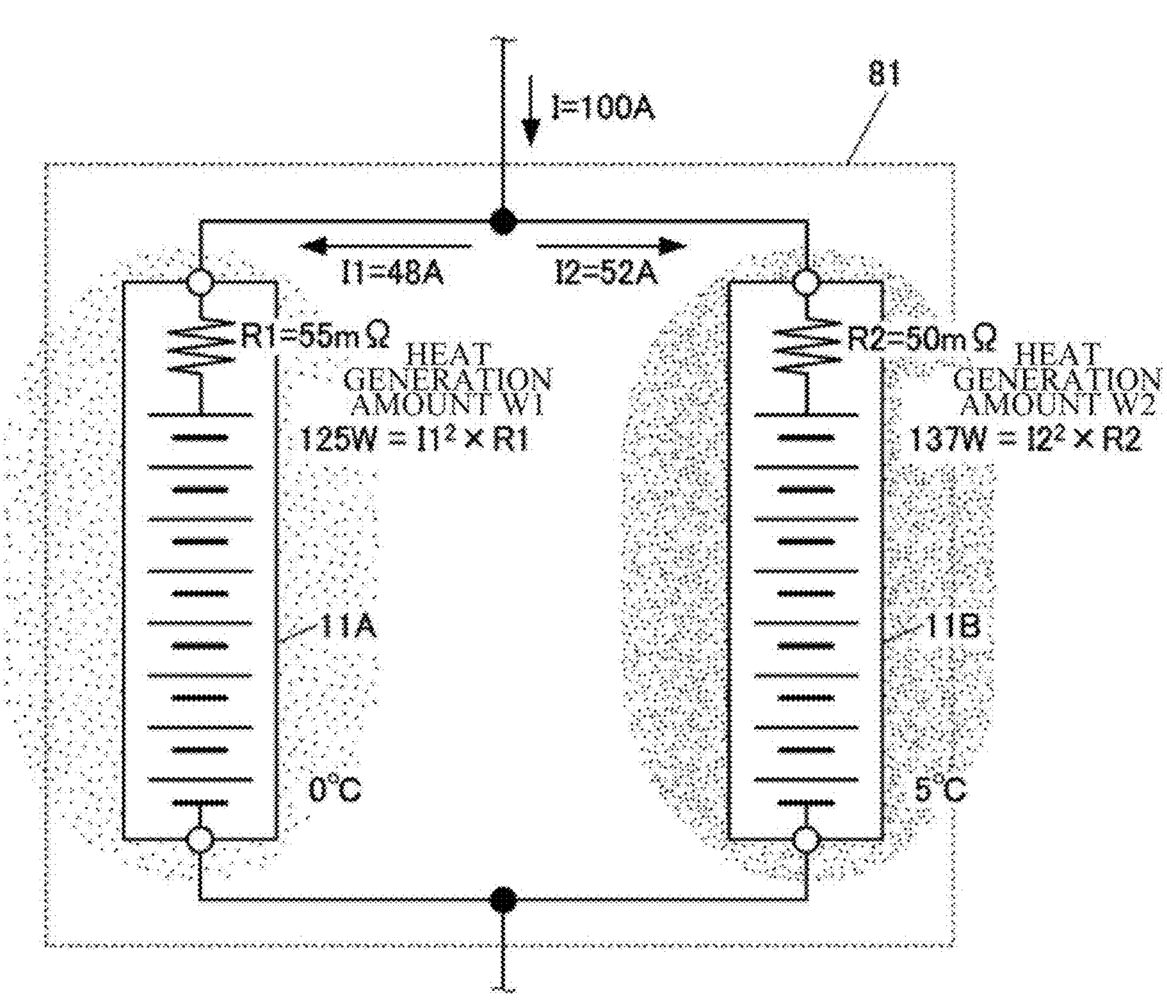

【 FIG. 5A 】
| | INITIAL STATE | |
|---|---|---|
| | TEMPE-RATURE | SOC |
| FIRST BATTERY GROUP | 0 °C | 30 % |
| SECOND BATTERY GROUP | 5 °C | 30 % |
| | AFTER DISCHARGING | |
|---|---|---|
| | TEMPE-RATURE | SOC |
| FIRST BATTERY GROUP | 1 °C | 29 % |
| SECOND BATTERY GROUP | 8 °C | 25 % |
【 FIG. 5B 】
| | INITIAL STATE | |
|---|---|---|
| | TEMPE-RATURE | SOC |
| FIRST BATTERY GROUP | 0 °C | 30 % |
| SECOND BATTERY GROUP | 5 °C | 30 % |
| | AFTER CHARGING | |
|---|---|---|
| | TEMPE-RATURE | SOC |
| FIRST BATTERY GROUP | 1 °C | 31 % |
| SECOND BATTERY GROUP | 8 °C | 35 % |

[ FIG. 6 ]
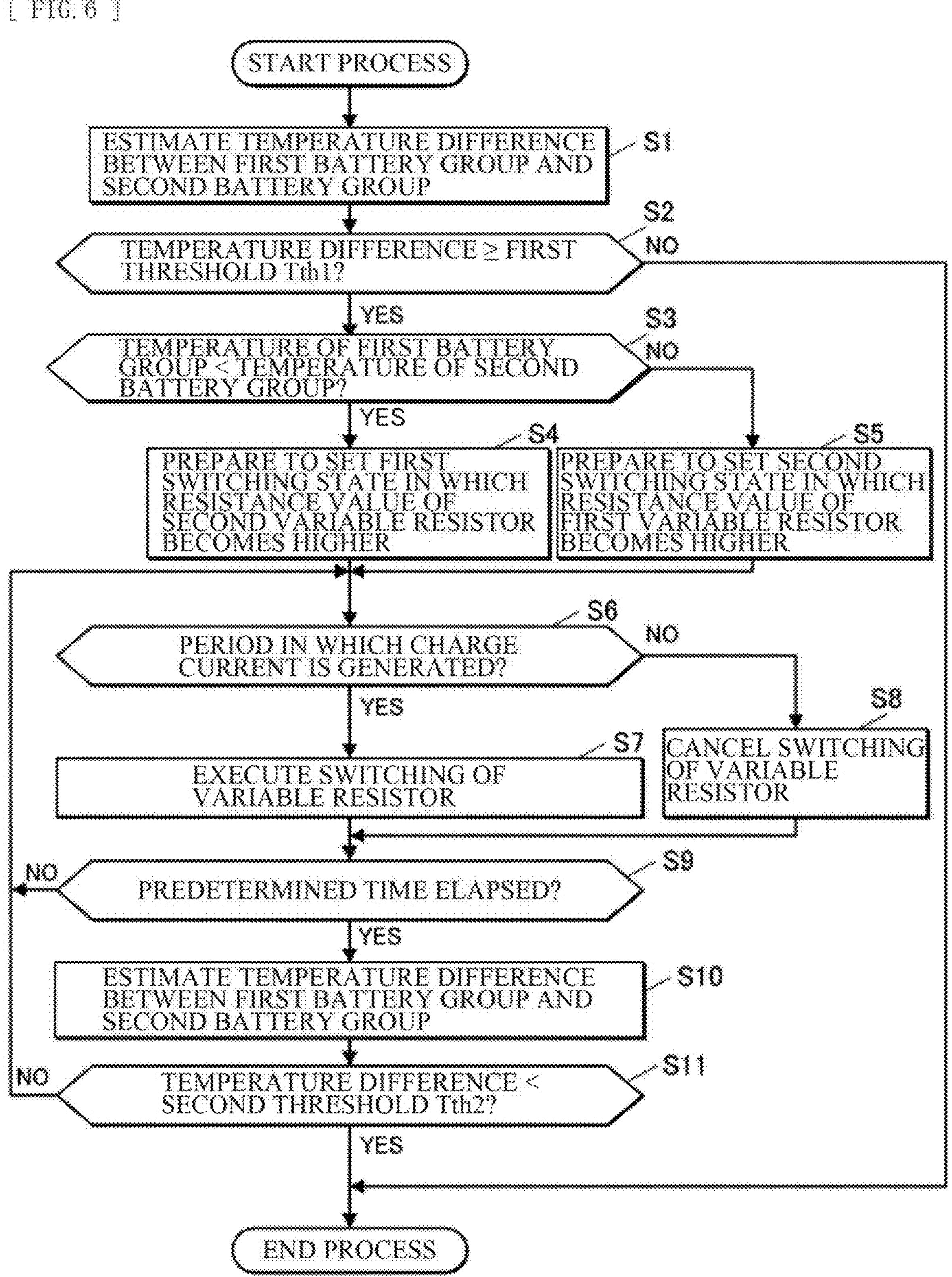

BATTERY CONTROL APPARATUS FOR ELECTRIC VEHICLE

CROSS-REFERENCE TO RELATED APPLICATIONS

This application is continuation of International Application No. PCT/JP2023/010660, filed on Mar. 17, 2023, the entire contents of which are hereby incorporated by reference.

BACKGROUND

The disclosure relates to a battery control apparatus for an electric vehicle.

Japanese Unexamined Patent Application Publication No. 2017-175758 discloses a configuration in which a variable resistance circuit is coupled to two battery groups in a power storage system to be mounted on a vehicle. The variable resistance circuit is so set that the smaller SOC of the battery groups, the smaller the discharge current flows.

SUMMARY

An aspect of the disclosure provides a battery control apparatus to be mounted on an electric vehicle. The electric vehicle includes a battery and a variable resistor. The battery includes a first battery group and a second battery group that are coupled in parallel to each other and configured to store electric power for traveling of the electric vehicle. The variable resistor is electrically coupled to the battery. The battery control apparatus for the electric vehicle includes a processor configured to control the variable resistor. The processor is configured to execute a resistance adjustment process, based on a difference between a temperature of the first battery group and a temperature of the second battery group. The resistance adjustment process is configured to control the variable resistor to cause a current per unit capacity of the first battery group and a current per unit capacity of the second battery group to be evenly closer to each other than when the resistance adjustment process is unexecuted. The processor is configured to refrain from executing the resistance adjustment process upon driving of the electric vehicle in which the electric power is to be outputted from the battery.

An aspect of the disclosure provides a battery control apparatus to be mounted on an electric vehicle. The electric vehicle includes a battery and a variable resistor. The battery includes a first battery group and a second battery group that are coupled in parallel to each other and configured to store electric power for traveling of the electric vehicle. The variable resistor is electrically coupled to the battery. The battery control apparatus for the electric vehicle includes a processor configured to control the variable resistor. The processor is configured to execute a resistance adjustment process, based on a difference between a temperature of the first battery group and a temperature of the second battery group. The resistance adjustment process is configured to control the variable resistor to cause a current per unit capacity of the first battery group and a current per unit capacity of the second battery group to be evenly closer to each other than when the resistance adjustment process is unexecuted. The processor is configured to: start the resistance adjustment process when the difference between the temperature of the first battery group and the temperature of the second battery group is equal to or greater than a first threshold; and end the resistance adjustment process when the difference between the temperature of the first battery group and the temperature of the second battery group is less than a second threshold.

An aspect of the disclosure provides a battery control apparatus to be mounted on an electric vehicle. The electric vehicle includes a battery and a variable resistor. The battery includes a first battery group and a second battery group that are coupled in parallel to each other and configured to store electric power for traveling of the electric vehicle. The variable resistor is electrically coupled to the battery. The battery control apparatus for the electric vehicle includes a processor configured to control the variable resistor. The processor is configured to execute a resistance adjustment process, when a difference between a temperature of the first battery group and a temperature of the second battery group exists upon a regenerative operation in which a regenerative electric power is to be sent to the battery. The resistance adjustment process is configured to control the variable resistor to cause a current per unit capacity of the first battery group and a current per unit capacity of the second battery group to be evenly closer to each other than when the resistance adjustment process is unexecuted.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 1 is a block diagram illustrating an electric vehicle equipped with a battery control apparatus according to one example embodiment of the disclosure.

FIG. 2 is a timing chart illustrating an example of a control that suppresses an overdischarge of a battery.

FIG. 3 is a diagram illustrating an output performance of a battery.

FIG. 4 is a diagram illustrating an example of a battery according to a comparative example.

FIG. 5A is a diagram illustrating an example of a change in a SOC and a temperature of each battery group upon discharging.

FIG. 5B is a diagram illustrating an example of the change in the SOC and the temperature of each battery group upon charging.

FIG. 6 is a flowchart illustrating an example of a battery control process to be executed by a processor of the battery control apparatus.

DETAILED DESCRIPTION

The inventor has found that, in a battery to be mounted on an electric vehicle, a difference in temperature between multiple battery groups is enlarged when the difference in temperature occurs between the battery groups, making it difficult for the battery to exhibit an intended battery performance. It is desirable to provide a battery control apparatus for an electric vehicle which makes it possible to reduce a temporary deterioration in performance of a battery resulting from a difference in temperature between multiple battery groups.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

(Electric Vehicle)

FIG. 1 is a block diagram illustrating an electric vehicle equipped with a battery control apparatus according to an example embodiment of the disclosure. Referring to FIG. 1, an electric vehicle 1 may include drive wheels 2, a braking device 3, an electric motor 20, a battery system 10, an operation member 26, a vehicle controller 22, an inverter 24, and a battery control apparatus 40. The braking device 3 may generate a braking force by friction. The electric motor 20 may drive the drive wheels 2. The battery system 10 may include a battery 11 that stores electric power for traveling of the electric vehicle 1. The operation member 26 may accept an operation for the traveling. The vehicle controller 22 may control the traveling. The inverter 24 may drive the electric motor 20. The battery control apparatus 40 may control the battery system 10.

The operation member 26 may be a mechanism to be operated by a driver who drives the electric vehicle 1 to drive the electric vehicle 1. The operation member 26 may include an accelerator operation member 26*a*, a brake operation member 26*b*, and a steering operation member 26*c*. For example, the accelerator operation member 26*a* may be an accelerator pedal, and adapted to transmit an acceleration command. For example, the brake operation member 26*b* may be a brake pedal, and adapted to transmit a braking command. For example, the steering operation member 26*c* may be a steering wheel, and adapted to perform steering. In one example, the operation member 26 may be operated by an automated driving device, and the accelerator operation member 26*a* and the brake operation member 26*b* may be based on a software configuration.

The vehicle controller 22 may receive an operation signal from the operation member 26, and so control the inverter 24 and thereby cause the electric motor 20 to perform a power running operation or a regenerative operation as to allow for acceleration or deceleration in response to the operation of the operation member 26. Upon the regenerative operation, a regenerative electric power may be sent to the battery 11. The vehicle controller 22 may be a microcomputer that operates in accordance with a control program.

The vehicle controller 22 may check a discharging capability and a charging capability of the battery 11 by exchanging data with the battery control apparatus 40. The discharging capability of the battery 11 may be represented by a dischargeable electric power Wout. The charging capability of the battery 11 may be represented by a chargeable electric power Win. The dischargeable electric power Wout may refer to an upper limit of the dischargeable electric power at a time point of interest. The chargeable electric power Win may refer to an upper limit of the chargeable electric power at a time point of interest.

The vehicle controller 22 may so adjust a drive torque of the electric motor 20 that the power upon the power running operation of the electric motor 20 does not exceed the discharging capability of the battery 11. The vehicle controller 22 may so adjust a regenerative torque of the electric motor 20 that the charging power generated by the regenerative operation of the electric motor 20 does not exceed the charging capability of the battery 11. It may sometimes be difficult to obtain the braking force required for the electric vehicle 1 by regenerative braking of the electric motor 20 due to a decrease in the charging capability of the battery 11. In such a case, the vehicle controller 22 may generate the required braking force by operating the braking device 3 in addition to the regenerative operation of the electric motor 20.

The vehicle controller 22 may perform a control that suppresses overdischarge of the battery 11. For example, the vehicle controller 22 may perform a control that stops discharging of the battery 11 when the discharging capability of the battery 11 is significantly reduced.

FIG. 2 is a timing chart illustrating an example of the control that suppresses the overdischarge of the battery 11. Referring to FIG. 2, the control that suppresses the overdischarge may be performed based on, for example, a voltage of the battery 11. In some embodiments, when the voltage of the battery 11 reaches a lower limit voltage Vlow (a timing t1), the vehicle controller 22 may stop a discharge current of the battery 11. In one example, although not illustrated, the vehicle controller 22 may also perform a control that gradually reduces the discharging of the battery 11 when an output voltage of the battery 11 approaches the lower limit voltage Vlow. The output voltage of the battery 11 may be monitored by the battery control apparatus 40, and pieces of data indicating that the output voltage has approached the lower limit voltage Vlow and that the output voltage has reached the lower limit voltage Vlow may be sent from the battery control apparatus 40 to the vehicle controller 22.

In some embodiments, the vehicle controller 22 may perform a similar control based on data on the dischargeable electric power Wout of the battery 11, instead of the output voltage. The vehicle controller 22 may so control the inverter 24 that the discharging of the battery 11 is stopped when the dischargeable electric power Wout is zero. The vehicle controller 22 may use in combination a control that gradually reduces the discharging of the battery 11 as the dischargeable electric power Wout approaches zero.

(Battery System and Battery Control Apparatus)

As illustrated in FIG. 1, the battery 11 may include a first battery group 11A having multiple battery cells and a second battery group 11B having multiple battery cells. The first battery group 11A may have a battery cell row in which the battery cells are coupled in series, or may have a configuration in which the multiple battery cell rows are coupled in parallel. This applies similarly to the second battery group 11B. The first battery group 11A and the second battery group 11B are coupled in parallel to each other. For example, the battery cells each may be any secondary battery such as a lithium-ion secondary battery or a nickel-hydrogen secondary battery.

In the following description, a storage capacity of the first battery group 11A and a storage capacity of the second battery group 11B are the same. Accordingly, a current per unit capacity of the first battery group 11A and a current per unit capacity of the second battery group 11B may be the same, where a current of the first battery group 11A and a current of the second battery group 11B are the same. The unit capacity may refer to a unit storage capacity.

The battery system 10 may include a variable resistor 12, a first temperature sensor 13*a*, and a second temperature sensor 13*b*. The variable resistor 12 is electrically coupled to the battery 11. The first temperature sensor 13*a* may estimate a temperature of the first battery group 11A. The second temperature sensor 13*b* may estimate a temperature of the second battery group 11B.

The variable resistor 12 may include multiple electrical resistors and multiple switches that switch a connection of the electrical resistors. The variable resistor 12 may be a circuit in which a resistance value on a current path changes by the switching of the switches. Any of various circuit configurations may be applied to the variable resistor 12 as long as the resistance value is changeable by a control. In some embodiments, the variable resistor 12 may include a first variable resistor 12A coupled in series to the first battery group 11A, and a second variable resistor 12B coupled in series to the second battery group 11B.

The first temperature sensor 13*a* may directly detect the temperature of the first battery group 11A. Alternatively, the first temperature sensor 13*a* may detect a temperature of any location where the temperature is correlated with the temperature of the first battery group 11A, and a processor 41 may estimate the temperature of the first battery group 11A, based on a result of the detected temperature. The second temperature sensor 13*b* may directly detect the temperature of the second battery group 11B. Alternatively, the second temperature sensor 13*b* may detect a temperature of any location where the temperature is correlated with the temperature of the second battery group 11B, and the processor 41 may estimate the temperature of the second battery group 11B, based on a result of the detected temperature. Upon estimating the temperatures, the processor 41 may be provided in advance with a data table in which detection results and the temperatures are associated with each other. The processor 41 may estimate the temperatures, based on the data table and the detection results.

The battery control apparatus 40 includes the processor 41 that controls the variable resistor 12. The processor 41 may be a microcomputer that operates in accordance with a control program. The detection result of the first temperature sensor 13*a* and the detection result of the second temperature sensor 13*b* may be sent to the processor 41. Data on an operation amount of the accelerator operation member 26*a* and data on an operation amount of the brake operation member 26*b* may be sent to the processor 41. The pieces of data on the operation amount may be sent to the processor 41 through the vehicle controller 22.

(Battery Characteristics)

FIG. 3 is a diagram illustrating an output performance (i.e., the dischargeable electric power Wout) of a typical battery. A map M1 of FIG. 3 is a typical map adapted to calculate the dischargeable electric power Wout from a temperature and a SOC of the battery. Referring to the map M1, the dischargeable electric power Wout varies in value depending on the temperature and the SOC of the battery. The dischargeable electric power Wout tends to increase as the temperature of the battery increases and increase as the SOC increases, in a temperature range in which the battery is usable. Similarly, although not illustrated, the chargeable electric power Win tends to increase as the temperature of the battery increases and increase as the SOC decreases, in the temperature range in which the battery is usable.

The battery control apparatus 40 may measure the temperature, the voltage, and the current of the battery 11, and manage the SOC, the dischargeable electric power Wout, and the chargeable electric power Win of the battery 11.

(Influence Based on Temperature Variations)

An influence of temperature variations occurring in multiple battery groups in a battery 81 according to a comparative example will be described. FIG. 4 is a diagram illustrating an example of the battery 81 according to the comparative example. FIG. 5A is a diagram illustrating an example of a change in a SOC and a temperature of each battery group upon discharging. FIG. 5B is a diagram illustrating an example of the change in the SOC and the temperature of each battery group upon charging. The battery 81 according to the comparative embodiment has a configuration in which the first battery group 11A and the second battery group 11B are coupled in parallel to each other, and does not include the variable resistor 12 of the example embodiment. The first battery group 11A and the second battery group 11B respectively have an internal resistance R1 and an internal resistance R2.

First, it is assumed as an initial state that the first battery group 11A and the second battery group 11B have the temperature variations and have the same SOC as each other (See "INITIAL STATE" in FIGS. 5A and 5B). The temperature variations are assumed to be such that the temperature 0° C. of the first battery group 11A is lower than the temperature 5° C. of the second battery group 11B.

The first battery group 11A has a characteristic that the lower the temperature, the higher the internal resistance R1. Similarly, the second battery group 11B has a characteristic that the lower the temperature, the higher the internal resistance R2. Accordingly, when the above-described temperature variations in the initial state exist as illustrated in FIG. 4, the internal resistance R1 of the first battery group 11A becomes larger than the internal resistance R2 of the second battery group 11B. If the current I flows through the battery 81 under such circumstances, a current I2 of the second battery group 11B becomes larger than a current I1 of the first battery group 11A due to the difference between the internal resistance R1 and the internal resistance R2. In addition, an amount of heat generation W2 of the second battery group 11B becomes larger than an amount of heat generation W1 of the first battery group 11A due to the differences between the currents and the internal resistances.

Consequently, when a discharge current is generated, a difference in temperature between the first battery group 11A and the second battery group 11B is widened as illustrated in "AFTER DISCHARGING" in FIG. 5A. Further, the SOC of the second battery group 11B higher in temperature than the first battery group 11A decreases rapidly, causing a difference in SOC between the first battery group 11A and the second battery group 11B.

In addition, when a charge current is generated, the difference in temperature between the first battery group 11A and the second battery group 11B is widened as illustrated in "AFTER CHARGING" in FIG. 5B. Further, a reduction occurs in an amount of increase in the SOC of the first battery group 11A lower in temperature than the second battery group 11B, causing the difference in SOC between the first battery group 11A and the second battery group 11B.

The difference in temperature between the first battery group 11A and the second battery group 11B causes a further increase in the difference in temperature due to the currents flowing therethrough. For example, the increase in the difference in temperature can cause one of the first battery group 11A and the second battery group 11B to have a very low temperature as compared with the other of the first battery group 11A and the second battery group 11B. In this case, when the charge current flows through one of the first and the second battery groups 11A and 11B that has reached the low temperature, there is a possibility that a deterioration of the battery group progresses due to, for example, a deposition of metal lithium on internal electrodes. Further, the increase in the difference in temperature can cause one of the first battery group 11A and the second battery group 11B to reach a very high temperature. In this case, there is a possibility that a material decomposition and a structural deterioration in cells progress in one of the first and the second battery groups 11A and 11B that has reached the high temperature. Consequently, there is an influence in which the deterioration between the first battery group 11A and the second battery group 11B becomes unbalanced.

The temperature variations between the first battery group 11A and the second battery group 11B also causes a difference in SOC due to the currents flowing therethrough, as illustrated in FIGS. 5A and 5B. The difference in the SOC results in a lack of a margin of discharging or charging of one of the first battery group 11A and the second battery group 11B even when the other of the first battery group 11A and the second battery group 11B has the margin of discharging or charging, causing an influence of limiting the discharging or the charging from the battery 81.

Further, in addition to the widening of the difference in temperature, the SOC of the first battery group 11A having a low temperature becomes lower in value than the SOC of the second battery group 11B having a high temperature after the charging, as illustrated in FIG. 5B. As described above, the dischargeable electric power Wout tends to decrease as the temperature decrease and decrease as the SOC decreases. Accordingly, the decrease in both the temperature and the SOC of the first battery group 11A causes the dischargeable electric power Wout of the first battery group 11A to be lower in value than the dischargeable electric power Wout of the second battery group 11B. This limits an output of the battery 81 due to the dischargeable electric power Wout of the first battery group 11A having the low value, e.g., a value of zero, even when the second battery group 11B has the margin. There is a high possibility that the limitation of the output occurs at the low temperature where the dischargeable electric power Wout becomes low in value, e.g., at a temperature of 10° C. or lower.

(Control Operation)

The processor 41 of the battery control apparatus 40 may perform the following example control operation in order to improve the influences based on the temperature variations described above.

First, the processor 41 may estimate the temperature of the first battery group 11A and the temperature of the second battery group 11B, based on the outputs of the first temperature sensor 13*a* and the second temperature sensor 13*b*. The processor 41 may estimate the temperatures based on any other condition without using the outputs of the temperature sensors, as long as the temperatures are estimable.

If the difference in temperature exists between the first battery group 11A and the second battery group 11B, the processor 41 executes a resistance adjustment process. The resistance adjustment process so controls the resistance value of the variable resistor 12 that the current flowing in the first battery group 11A and the current flowing in the second battery group 11B are evenly closer to each other than when the resistance adjustment process is not executed.

Executing the resistance adjustment process evenly brings both the current flowing in the first battery group 11A and the current flowing in the second battery group 11B close to each other even when the difference in temperature occurs between the first battery group 11A and the second battery group 11B, allowing amounts of heat generated by self-heating between the first battery group 11A and the second battery group 11B to be evenly approached each other or reversed in magnitude from each other. This configuration helps to reduce the widening in the difference in temperature between the first battery group 11A and the second battery group 11B. Accordingly, the configuration helps to suppress the example influences caused by the widening of the difference in temperature described above.

In some embodiments, in the resistance adjustment process, the processor 41 may cause the resistance value of the first variable resistor 12A to be larger than the resistance value of the second variable resistor 12B when the temperature of the first battery group 11A is higher than the temperature of the second battery group 11B. In some embodiments, when the temperature of the first battery group 11A is lower than the temperature of the second battery group 11B, the processor 41 may cause the resistance value of the first variable resistor 12A to be smaller than the resistance value of the second variable resistor 12B. This control helps to evenly bring the current of the first battery group 11A and the current of the second battery group 11B close to each other.

In some embodiments, the processor 41 may execute the resistance adjustment process based on the conditions described above upon the regenerative operation in which the charge current is to be sent to the battery 11. Executing the resistance adjustment process when the charge current is sent helps to reduce the occurrence of the example situation illustrated in "AFTER CHARGING" in FIG. 5B. The situation is that both the temperature and the SOC are lowered in one of the first battery group 11A and the second battery group 11B, and thereby the dischargeable electric power Wout is lowered as compared with the other of the first battery group 11A and the second battery group 11B. Executing the resistance adjustment process when the charge current is to be sent helps to reduce the dischargeable electric power Wout of one of the first battery group 11A and the second battery group 11B first, and thereby to reduce an influence in which the output of the battery 11 is limited as a whole.

In some embodiments, the processor 41 may refrain from executing the resistance adjustment process upon driving in which the discharge current is to be outputted from the battery 11. In the electric vehicle 1, a larger current tends to flow in the battery 11 at the time of acceleration than at the time of braking. One reason is that the braking of the electric vehicle 1 is achieved by a combination of the regenerative braking and braking by the braking device 3, whereas the acceleration of the electric vehicle 1 is achieved primarily by the power running operation of the electric motor 20. Accordingly, refraining from executing the resistance adjustment process upon the driving increases the probability that the resistance adjustment process is unexecuted at the time when the large current flows. This configuration helps to suppress an electric power loss occurring in the variable resistor 12 during a period of the driving in which the influences of the temperature variations are small.

In addition, refraining from executing the resistance adjustment process upon the driving reduces the discharge current of one of the first battery group 11A and the second battery group 11B which is lower in temperature, which helps to suppress the decrease in the SOC of one of the first battery group 11A and the second battery group 11B which is lower in temperature. This configuration helps to suppress the decrease in both the temperature and the SOC of one of the first battery group 11A and the second battery group 11B. Accordingly, this configuration helps to reduce the dischargeable electric power Wout of one of the first battery group 11A and the second battery group 11B first, and thereby to reduce the influence in which the output of the battery 11 is limited as a whole.

In some embodiments, the processor 41 may determine whether a situation is the regenerative operation in which the charge current is sent or whether the situation is the driving in which the electric power is outputted from the battery 11, based on the data on the operation amount of the brake operation member 26*b* and the data on the operation amount of the accelerator operation member 26*a*. In some embodiments, the processor 41 may detect a current flowing through a power line coupled to the battery 11 and thereby determine whether a period in which the charge current is sent is satisfied or whether a period in which the discharge current is outputted is satisfied.

The possibility that the phenomenon occurs becomes high at a low temperature; the phenomenon is that the dischargeable electric power Wout of one of the first battery group 11A and the second battery group 11B decreases first and thereby the limitation of the output of the battery 11 as a whole occurs. Accordingly, in some embodiments, the processor 41 may add a condition that the temperature is low to the condition of executing the resistance adjustment process. The low temperature may be 25° C. or less, 10° C. or less, or 0° C. or less. The low temperature may be defined as a temperature at which the dischargeable electric power Wout becomes 20% or less of a maximal value when the SOC is 10%.

In some embodiments, the processor 41 may start the resistance adjustment process when the difference in temperature between the first battery group 11A and the second battery group 11B is equal to or greater than a first threshold. In some embodiments, the processor 41 may end the resistance adjustment process when the difference in temperature becomes less than a second threshold. The first threshold is not particularly limited. For example, the first threshold may be a value within a range from 5° C. to 15° C. The second threshold is not particularly limited. For example, the second threshold may be a value within a range from 0° C. to 15° C. lower than the first threshold. This configuration helps to execute the resistance adjustment process at such an appropriate timing that an advantage of the resistance adjustment process exceeds an example concern of the resistance adjustment process such as a generation of the electric power loss.

(Battery Control Process)

Next, an example of a battery control process to be executed by the processor 41 of the battery control apparatus 40 will be described with reference to a flowchart. FIG. 6 is the flowchart illustrating an example of the battery control process. The battery control process may be repeatedly executed while the electric vehicle 1 is in operation.

When the battery control process is started, the processor 41 may estimate the difference in temperature between the first battery group 11A and the second battery group 11B, based on the outputs of the first temperature sensor 13*a* and the second temperature sensor 13*b* (step S1).

The processor 41 may determine whether the difference in temperature between the first battery group 11A and the second battery group 11B is equal to or greater than a first threshold Tth1 (step S2). For example, the difference in temperature may refer to an absolute value of the difference between the temperatures of the first battery group 11A and the second battery group 11B. If the difference in temperature between the first battery group 11A and the second battery group 11B is less than the first threshold Tth1 (step S2: No), the processor 41 may end the current battery control process.

If the difference in temperature between the first battery group 11A and the second battery group 11B is equal to or greater than the first threshold Tth1 (step S2: Yes), the processor 41 may determine which of the first battery group 11A and the second battery group 11B is lower in temperature (step S3). If the first battery group 11A is lower in temperature (step S3: Yes), the processor 41 may prepare to set a first switching state in which the resistance of the second variable resistor 12B becomes higher than the resistance of the first variable resistor 12A (step S4). If the second battery group 11B is lower in temperature (step S3: No), the processor 41 may prepare to set a second switching state in which the resistance of the first variable resistor 12A becomes higher than the resistance of the second variable resistor 12B (step S5). In some embodiments, each of the first switching state and the second switching state may be a predetermined switching state of the variable resistor 12. In some embodiments, each of the first switching state and the second switching state may be a switching state in which the resistance value is varied in accordance with the difference in temperature. In either case, setting the first switching state or the second switching state helps to bring the currents flowing through the first battery group 11A and the second battery group 11B evenly close to each other as compared with a case where the setting is not made.

The processor 41 may determine whether the charge current is generated (step S6). For example, the processor 41 may determine whether the regenerative operation is performed in which the regenerative electric power is generated. In some embodiments, the processor 41 may determine whether a current situation is the regeneration in which the regenerative operation of the electric motor 20 is performed, by determining whether the operation amount of the accelerator operation member 26*a* is decreasing or whether the operation amount of the brake operation member 26*b* is greater than zero.

If the charge current is generated (e.g., upon the regenerative operation), the processor 41 may switch the variable resistor 12 to the first switching state or the second switching state prepared in step S4 or step S5 (step S7). If the charge current is not generated, the processor 41 41 may cancel the switching of the variable resistor 12 (step S8). In some embodiments, the cancelling of the switching may mean that the resistance value of the first variable resistor 12A and the resistance value of the second variable resistor 12B are both set to zero. In some embodiments, the cancelling of the switching of the variable resistor 12 may mean that the resistance value of the first variable resistor 12A and the resistance value of the second variable resistor 12B are set to a predetermined value, e.g., to an equal predetermined value.

The processor 41 may count an elapsed time of a looping process from step S6 to step S9, and determine whether a predetermined time has elapsed (step S9). For example, the predetermined time may be 10 seconds. If it is determined that the time has not yet elapsed (step S9: No), the processor 41 may return the process to step S6 and continue the looping process from step S6 to step S9.

If it is determined that the time has elapsed (step S9: Yes), the processor 41 may estimate the difference in temperature between the first battery group 11A and the second battery group 11B, based on the outputs of the first temperature sensor 13*a* and the second temperature sensor 13*b* (step S10).

The processor 41 may determine whether the difference in temperature between the first battery group 11A and the second battery group 11B is less than a second threshold Tth2 (step S11). If the difference in temperature between the first battery group 11A and the second battery group 11B is equal to or greater than the second threshold Tth2 (step S11: No), the processor 41 may return the process to step S6 and continue the looping process from step S6 to step S11. If the difference in temperature between the first battery group 11A and the second battery group 11B is less than the second threshold Tth2 (step S11: Yes), the processor 41 may end the current battery control process.

The example battery control process described above may achieve an example of the above-described control operation of the battery system 10.

In some embodiments, a condition that the battery 11 is at a low temperature may be added to the condition of making a transition to step S4 or S5, or to the condition of making the transition to step S7. Whether the temperature of the battery 11 is low may be determined by the processor 41, based on the temperature of the battery 11 or an ambient temperature of the battery 11. Non-limiting examples of the temperature of the battery 11 may include an average temperature, a maximum temperature, and a minimum temperature. Non-limiting examples of the ambient temperature of the battery 11 may include an air temperature and a coolant temperature. The low temperature may be as described above. This configuration helps to reduce the switching of the variable resistor 12 at a high temperature where the example influences caused by the temperature variations are small. Accordingly, this configuration helps to reduce an occurrence of a loss due to the resistance of the variable resistor 12 when the example influences caused by the temperature variations are small.

A program of the battery control process may be stored in a non-transitory storage medium 41*a* provided in the processor 41. The processor 41 may be configured to read the program stored in a portable non-transitory recording medium and execute the program. The portable non-transitory storage medium may store the program of the battery control process.

Although some example embodiments of the disclosure have been described in the foregoing by way of example with reference to the accompanying drawings, the disclosure is by no means limited to the embodiments described above. For example, in the above example embodiment, the first battery group 11A and the second battery group 11B may have the same storage capacity. In some embodiments, the storage capacity of the first battery group 11A and the storage capacity of the second battery group 11B may be different from each other. In this case, the current flowing through the first battery group 11A or the second battery group 11B (e.g., the discharge current and the charge current) described in the example embodiment may be read as a current per unit capacity. In addition, the resistance value of the first variable resistor 12A or the second variable resistor 12B may be read as a resistance value per unit capacity. Further, the amount of heat generation of the first battery group 11A or the second battery group 11B may be read as an amount of heat generation per unit capacity.

In the above example embodiment, the battery 11 may include two battery groups of the first battery group 11A and the second battery group 11B. In some embodiments, the battery 11 may include three or more battery groups coupled in parallel to each other. In this case, any one of the battery groups may serve as the first battery group, and any other one of the battery groups may serve as the second battery group.

In the above example embodiment, the electric vehicle 1 may be an electric vehicle (EV) where an internal combustion engine is not provided. In some embodiments, the electric vehicle 1 may be a hybrid electric vehicle (HEV) or a plug-in hybrid electric vehicle (PHEV). It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The processor 41 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 41. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 41 illustrated in FIG. 1.

The invention claimed is:

1. A battery control apparatus to be mounted on an electric vehicle, the electric vehicle comprising: a battery and a variable resistor, the battery comprising a first battery group and a second battery group that are coupled in parallel to each other and being configured to store electric power for traveling of the electric vehicle, the variable resistor being electrically coupled to the battery, the battery control apparatus for the electric vehicle comprising a processor configured to control the variable resistor, wherein the processor is configured to execute a resistance adjustment process, based on a difference between a temperature of the first battery group and a temperature of the second battery group, the resistance adjustment process is configured to control the variable resistor to cause a current per unit capacity of the first battery group and a current per unit capacity of the second battery group to approach each other more closely than when the resistance adjustment process is unexecuted, and the processor is configured to: determine whether the electric power is being outputted from the battery while the electric vehicle is being driven, and refrain from executing the resistance adjustment process in response to determining that the electric power is being outputted from the battery while the electric vehicle is being driven, the variable resistor comprises a first variable resistor coupled in series to the first battery group, and a second variable resistor coupled in series to the second battery group, and the resistance adjustment process is configured to: cause a resistance value of the first variable resistor to be larger than a resistance value of the second variable resistor when the temperature of the first battery group is higher than the temperature of the second battery group; and cause the resistance value of the first variable resistor to be smaller than the resistance value of the second variable resistor when the temperature of the first battery group is lower than the temperature of the second battery group.

2. The battery control apparatus according to claim 1, wherein the processor is configured to execute the resistance adjustment process, when the difference between the temperature of the first battery group and the temperature of the second battery group exists upon a regenerative operation in which a regenerative electric power is to be sent to the battery.

3. A battery control apparatus to be mounted on an electric vehicle, the electric vehicle comprising: a battery and a variable resistor, the battery comprising a first battery group and a second battery group that are coupled in parallel to each other and being configured to store electric power for traveling of the electric vehicle, the variable resistor being electrically coupled to the battery, the battery control apparatus for the electric vehicle comprising a processor configured to control the variable resistor, wherein the processor is configured to execute a resistance adjustment process, based on a difference between a temperature of the first battery group and a temperature of the second battery group, the resistance adjustment process is configured to control the variable resistor to cause a current per unit capacity of the first battery group and a current per unit capacity of the second battery group to approach each other more closely than when the resistance adjustment process is unexecuted, and the processor is configured to start the resistance adjustment process when the difference between the temperature of the first battery group and the temperature of the second battery group is equal to or greater than a first threshold, and end the resistance adjustment process when the difference between the temperature of the first battery group and the temperature of the second battery group is less than a second threshold, the variable resistor comprises a first variable resistor coupled in series to the first battery group, and a second variable resistor coupled in series to the second battery group, and the resistance adjustment process is configured to: cause a resistance value of the first variable resistor to be larger than a resistance value of the second variable resistor when the temperature of the first battery group is higher than the temperature of the second battery group; and cause the resistance value of the first variable resistor to be smaller than the resistance value of the second variable resistor when the temperature of the first battery group is lower than the temperature of the second battery group.

4. A battery control apparatus to be mounted on an electric vehicle, the electric vehicle comprising a battery and a variable resistor, the battery comprising a first battery group and a second battery group that are coupled in parallel to each other and being configured to store electric power for traveling of the electric vehicle, the variable resistor being electrically coupled to the battery, the battery control apparatus for the electric vehicle comprising a processor configured to control the variable resistor, wherein the processor is configured to execute a resistance adjustment process, based on a difference between a temperature of the first battery group and a temperature of the second battery group, the resistance adjustment process is configured to control the variable resistor to cause a current per unit capacity of the first battery group and a current per unit capacity of the second battery group to approach each other more closely than when the resistance adjustment process is unexecuted, and the processor is configured to start the resistance adjustment process when the difference between the temperature of the first battery group and the temperature of the second battery group is equal to or greater than a first threshold, and end the resistance adjustment process when the difference between the temperature of the first battery group and the temperature of the second battery group is less than a second threshold, the variable resistor comprises a first variable resistor coupled in series to the first battery group, and a second variable resistor coupled in series to the second battery group, and the resistance adjustment process is configured to:

cause a resistance value of the first variable resistor to be larger than a resistance value of the second variable resistor when the temperature of the first battery group is higher than the temperature of the second battery group; and cause the resistance value of the first variable resistor to be smaller than the resistance value of the second variable resistor when the temperature of the first battery group is lower than the temperature of the second battery group.

5. The battery control apparatus according to claim 4, wherein the processor is configured to execute the resistance adjustment process, when the difference between the temperature of the first battery group and the temperature of the second battery group exists upon a regenerative operation in which a regenerative electric power is to be sent to the battery.

* * * * *